(12) United States Patent
Field

(10) Patent No.: US 6,441,896 B1
(45) Date of Patent: Aug. 27, 2002

(54) METHOD AND APPARATUS FOR MEASURING SPATIAL UNIFORMITY OF RADIATION

(75) Inventor: Halden Field, Boulder, CO (US)

(73) Assignee: Midwest Research Institute, Kansas City, MO (US)

( * ) Notice: Subject to any disclaimer, the term of this patent is extended or adjusted under 35 U.S.C. 154(b) by 0 days.

(21) Appl. No.: 09/432,625

(22) Filed: Dec. 17, 1999

(51) Int. Cl.[7] .................................................. G01J 1/42
(52) U.S. Cl. ........................................................ 356/222
(58) Field of Search ................................. 356/218, 250, 356/222, 226

(56) References Cited

U.S. PATENT DOCUMENTS

| | | | | |
|---|---|---|---|---|
| 3,867,036 A | * | 2/1975 | Detwiler et al. ............. | 356/121 |
| 4,218,139 A | * | 8/1980 | Sheffield ..................... | 356/218 |
| 4,222,665 A | * | 9/1980 | Tachizawa et al. .......... | 356/218 |
| 4,304,473 A | * | 12/1981 | Shreve ......................... | 354/23 |
| 4,609,288 A | * | 9/1986 | Dodge .......................... | 356/218 |
| 4,660,075 A | * | 4/1987 | Hashimoto et al. ........... | 358/29 |
| 4,678,330 A | * | 7/1987 | Gutschick et al. ........... | 356/222 |
| 5,066,121 A | * | 11/1991 | Bernhard ..................... | 356/218 |
| 5,327,210 A | * | 7/1994 | Okui et al. ................... | 356/218 |
| 5,495,329 A | * | 2/1996 | Anderson, II et al. ....... | 356/218 |
| 5,548,398 A | * | 8/1996 | Gaboury ...................... | 356/218 |
| 5,777,728 A | * | 7/1998 | Schiller ....................... | 356/222 |
| 5,959,727 A | * | 9/1999 | Krohn .......................... | 356/229 |

* cited by examiner

Primary Examiner—Frank G. Font
Assistant Examiner—Michael P. Stafira
(74) Attorney, Agent, or Firm—Paul J. White

(57) ABSTRACT

A method and apparatus for measuring the spatial uniformity of the intensity of a radiation beam from a radiation source based on a single sampling time and/or a single pulse of radiation. The measuring apparatus includes a plurality of radiation detectors positioned on planar mounting plate to form a radiation receiving area that has a shape and size approximating the size and shape of the cross section of the radiation beam. The detectors concurrently receive portions of the radiation beam and transmit electrical signals representative of the intensity of impinging radiation to a signal processor circuit connected to each of the detectors and adapted to concurrently receive the electrical signals from the detectors and process with a central processing unit (CPU) the signals to determine intensities of the radiation impinging at each detector location. The CPU displays the determined intensities and relative intensity values corresponding to each detector location to an operator of the measuring apparatus on an included data display device. Concurrent sampling of each detector is achieved by connecting to each detector a sample and hold circuit that is configured to track the signal and store it upon receipt of a "capture" signal. A switching device then selectively retrieves the signals and transmits the signals to the CPU through a single analog to digital (A/D) converter. The "capture" signal. is then removed from the sample-and-hold circuits. Alternatively, concurrent sampling is achieved by providing an A/D converter for each detector, each of which transmits a corresponding digital signal to the CPU. The sampling or reading of the detector signals can be controlled by the CPU or level-detection and timing circuit.

31 Claims, 2 Drawing Sheets

METHOD AND APPARATUS FOR MEASURING SPATIAL UNIFORMITY OF RADIATION

CONTRACTUAL ORIGIN OF THE INVENTION

The United States Government has rights in this invention under Contract No. DE-AC36-99GO-10337 between the United States Department of Energy and the National Renewable Energy Laboratory, a Division of the Midwest Research Institute.

BACKGROUND OF THE INVENTION

1. Field of the Invention

The present invention relates generally to a method and apparatus for measuring spatial uniformity of a radiation beam from a pulsed or continuous radiation source and, more particularly, for simultaneously measuring the intensity of the radiation from the radiation source at a number of locations in a cross sectional area of the radiation beam to provide spatial uniformity data in less time and with improved temporal accuracy to characterize and facilitate alignment, adjustment, and calibration of the radiation source.

2. Description of the Related Art

Radiation sources are well-known and have a wide range of uses, ranging from standard light sources to x-ray machines to solar simulators. Typically, it is desirable that such radiation sources produce radiation beams having known or adjustable intensities, spectrums, and crosssectional shapes and sizes to suit a particular use. For example, radiation sources are useful for producing radiation beams that are used for testing or causing a predictable reaction with numerous materials and systems that react to a given type of radiation in a known and desired manner. For example, solar or photovoltaic cells are designed and constructed to receive solar radiation and convert it into electrical energy. It is important that the solar simulator radiation source provide a radiation beam having identical, or only slightly varying, intensity at any point in the cross section of the beam, i.e., spatial uniformity, so as to obtain acceptable test results and equal reaction rates across the tested material.

In particular, solar simulator-type radiation sources have become increasingly important and are used to produce radiation beams with characteristics, such as intensity and spectrum, that simulate radiation that would be received from the sun at various geographic, atmospheric, or orbiting locations. In this way, solar simulators can be used to imitate actual field conditions, which is useful for testing photovoltaic conversion efficiencies of solar cells/arrays, resistances to solar radiation of various materials including sun screen compounds, numerous biological and. medical interactions with solar radiation, and other material or system properties. As, discussed above, for these tests to be accurate, i.e., give similar results at any point on the surface area being tested, it is necessary that the solar simulator produce a radiation beam with acceptable spatial uniformity. Certain American Society for Testing and Materials (ASTM) specifications dictate that the spatial uniformity for solar simulators be very high with a variance from a median intensity value of less than 10 percent for Class C, less than 5 percent for Class B, and even more restrictive, less than 2 percent for Class A. Without such high spatial uniformity, the test results can include errors that can go undetected thereby resulting in the test subject being rejected or even redesigned based on inaccurate test data. Therefore, an important and necessary step in using a radiation source, such as a solar simulator, is the alignment, adjustment, and calibration of the source to establish spatial uniformity, and, of course, it is desirable that this step be accomplished accurately and inexpensively.

A currently accepted method of checking spatial uniformity on a test surface, such as a photovoltaic array, involves placing a single radiation or photo detector at a first location on the test surface and measuring the intensity of a radiation beam produced by a radiation source. The detector is then moved to a number of other locations on the test surface, and the intensities of additional radiation beams from the radiation source are measured. A median intensity is calculated, and variance from this median intensity is determined at each measuring location on the test surface. If the results of the measured intensities and calculated variances indicate an unacceptable intensity variance in the radiation beam, the radiation source is adjusted in an attempt to better align the source to achieve an acceptable spatial uniformity. Each of these steps is then repeated until an acceptable spatial uniformity is achieved. As can be understood, this can be a tedious and time consuming process, especially with larger test surfaces, such as typical solar cell array modules, that require numerous measurements to provide an accurate representation of intensities across the entire surface area.

This procedure is used for aligning both continuous and pulse radiation sources with the assumption that temporal variation of the radiation beams produced by the source is negligible or in other words, that each beam produced is identical. In the case of a pulse source, each pulse is assumed to be equivalent in intensity and the intensity of the radiation beam is typically calculated by integrating or summing the intensity values over the entire length of the pulse, i.e., without making discrete measurements during transmission of the pulse beam. Additionally, the cost and difficulty of aligning/calibrating a radiation source are often further increased because making adjustments to the radiation source may be a complicated process itself that requires an operator to make simultaneous adjustments of several interrelated components to try to properly align the source.

For examples of various single-detector, radiation measuring devices, see U.S. Pat. No. 5,3274210 issued to Okui et al., U.S. Pat. No. 5,548,398 issued to Gaboury, and U.S. Pat. No. 4,218,139 issued to Sheffield.

Some efforts have been made to develop devices that can automate the movement or scanning of the single radiation detector across the radiation beam and that, at least potentially, can reduce error caused by the human placement and movement of the single radiation detector. For example, U.S. Pat. No. 3,867,036 issued to Detwiler et al. discloses a limit display circuit that includes a device for sequentially sampling or measuring intensities of a radiation beam by using a control motor to move a single photocell sensor across a radiation beam. However, use of this device for aligning and adjusting a radiation source is limited by the size, shape, and movement capabilities of the control motor, which itself has to be carefully calibrated and designed to control accuracy and can cause errors by introducing moving components into the testing device. As illustrated, the device is likely only useful for relatively small beams having linear cross-sectional shapes.

Consequently, there remains a need for devices and methods that will reduce the time that is required to measure the spatial uniformity of a radiation beam produced by a radiation source, such as a solar simulator, to facilitate quick, accurate, and inexpensive adjustment, alignment, and/or calibration of the radiation source.

SUMMARY OF THE INVENTION

Accordingly, it is a general object of the present invention to provide a method and apparatus for use in characterizing, aligning, adjusting, and/or calibrating a radiation source with improved accuracy and speed.

It is a related object of the present invention to provide a more effective method and apparatus for measuring the spatial uniformity of the intensity of a beam(s) from a radiation source(s).

It is a specific object of the present invention to provide a method and apparatus for use in aligning, adjusting, and/or calibrating pulse and continuous radiation sources that minimizes possible testing errors due to temporal variances of the radiation produced by the source.

It is another specific object of the present invention to provide a method and apparatus for determining spatial uniformity of a pulsed radiation source based on a single pulse.

It is another specific object of the present invention to provide a method and apparatus for determining spatial uniformity of a radiation source that does not require movement of a radiation detector(s).

Additional objects, advantages, and novel features of the invention are set forth in part in the description that follows and will become apparent to those skilled in the art upon examination of the following description and figures or may be learned by practicing the invention. Further, the objects and the advantages of the invention may be realized and attained by means of the instrumentalities and in combinations particularly pointed out in the appended claims.

To achieve the foregoing and other objects and in accordance with the purposes of the present invention, as embodied and broadly described herein, a measuring apparatus is provided for measuring, based on a single sampling time and/or a single pulse, the spatial uniformity of the radiation intensity in a beam produced by a radiation source. The measuring apparatus includes a detector array with a plurality of detectors that is positioned within the radiation beam such that the detectors concurrently receive portions of the radiation beam as it strikes the detector array. As the radiation source transmits a continuous beam or a pulsed beam, the, detectors operate to concurrently generate electrical signals proportional to the intensities of the portions of the radiation beam that impinge on the detectors. The measuring apparatus further includes a signal processor circuit connected to the detectors for concurrently sampling the detectors at a specific sampling time and then processing received electrical signals from the detectors to determine the spatial uniformity of the radiation beam.

A central processing unit (CPU) with memory and logic is provided in the signal processor circuit for determining radiation intensities of the radiation beam at each detector location in the detector array and for determining a median intensity value for the radiation beam, specifically, for the cross section of the radiation beam striking the detector array. The CPU then compares the determined radiation intensities to the median intensity value to determine relative intensity values of the radiation. These relative intensity values can then be displayed to an operator of the measuring apparatus, on an included data display device, relative or linked to the detector location and in a numerical manner (for example, "100%" if the relative intensity matches the median intensity value or "97%" or "105%" if it varies from the median intensity value) and/or in a pictorial manner (for example, a multicolored shape similar to that of the radiation beam cross section with certain colors indicating intensities matching the median intensity value and with certain other colors indicating lower and higher intensities). In this manner, the measuring. apparatus can be used by an operator to quickly determine spatial uniformity and make alignment and calibration steps on the radiation source based on the information shown on the data display device.

In one embodiment, a relatively large number of detectors, i.e., sixty-four, are included in the detector array to provide detailed sampling of the radiation beam. The detectors are positioned on a planar mounting plate in a pattern that forms a radiation receiving area having the approximate size and shape of the radiation beam cross section. The detectors in the radiation receiving area concurrently provide intensity information at substantially any point in the cross section of the radiation beam at the specific sampling time. In an alternate embodiment, the detectors are positioned to face varying directions to receive radiation from different directions and/or more than one radiation source to allow an operator, for example, to quickly identify radiation intensities on any number of surfaces and to then adjust the radiation source(s) to achieve desired illumination effects, such as photographic, cinematic, or other lighting effects.

To provide concurrent sampling of the detectors, the signal processor circuit in one embodiment includes a sample and hold circuit for each of the detectors. The sample and hold circuits are electrically connected to the detectors via an amplifier and are configured to receive the electrical signals from the detectors and to store the signals. A switching device, such as a multiplexer, is included in the signal processor circuit for selectively and sequentially switching between one or more of the sample and hold circuits to read or receive the signals and transmit the electrical signals on to an analog to digital (A/D) converter. The signals are then sequentially transmtitted to the CPU from the A/D converter in digital form. The CPU then processes the signals, as discussed above, while maintaining the link:between the digital signal and the location of the detector on the detector array to facilitate later display of relative intensity values relative to the detector locations. In an alternate embodiment, the signal processor circuit includes an A/D converter for each detector/amplifier combination, with each amplifier output fed to an A/D converter. Digital information from each A/D converter is fed in serial or parallel to the CPU. In both of the above embodiments, a timing circuit can be electrically connected to one or more detectors and the CPU to control tiring of radiation sampling by measuring the intensity of the radiation impinging on the detector(s) and providing a signal to begin concurrent sampling of the detectors when the radiation intensity reaches or falls below a preset or selectable intensity level.

To further achieve the foregoing and other objects, the present invention further comprises a method of measuring the spatial uniformity of the intensity of a radiation beam produced by a radiation source. The method includes positioning a detector array with a plurality of detectors transverse to an axis of the radiation beam, electrically connecting a signal processor circuit to each detector, receiving with the detectors portions of the radiation beam, concurrently transmitting with the detectors electrical signals representative of the intensities of the radiation impinging on the detectors to a signal processor circuit, and processing with a CPU in the signal processor circuit the electrical signals to determine the energy intensities of the radiation at each detector location, and therefore, determine the spatial uniformity of the radiation beam, based on a single sampling time and/or a single pulse from the radiation source.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings.

DETAILED DESCRIPTION OF THE INVENTION

With the above summary of the invention in mind, it will be helpful in more fully understanding the inventive features of the present- invention to provide a thorough and detailed description of a number of specific embodiments of the invention. Specifically, the following discussion emphasizes the features of the invention that provide a method and apparatus for measuring radiation to quickly and accurately determine spatial uniformity of a radiation beam produced by a radiation source. An important feature of each embodiment of the invention is that a plurality of detectors is sampled concurrently such that the intensity of radiation at a plurality of locations in a radiation beam cross'section can be determined at a single sampling time or during a single pulse or even at a single point in a pulse. To further facilitate understanding of the invention, the embodiments presented will be described as implemented for use with solar simulator radiation sources, but it will be clear from the following discussion that the features of the invention make it useful for aligning and calibrating almost any radiation source (e.g., standard lighting, x-ray sources, radio wave devices, and radioactive sources) with or without minor alterations in circuitry, components, and/or computer logic.

Figure 1:
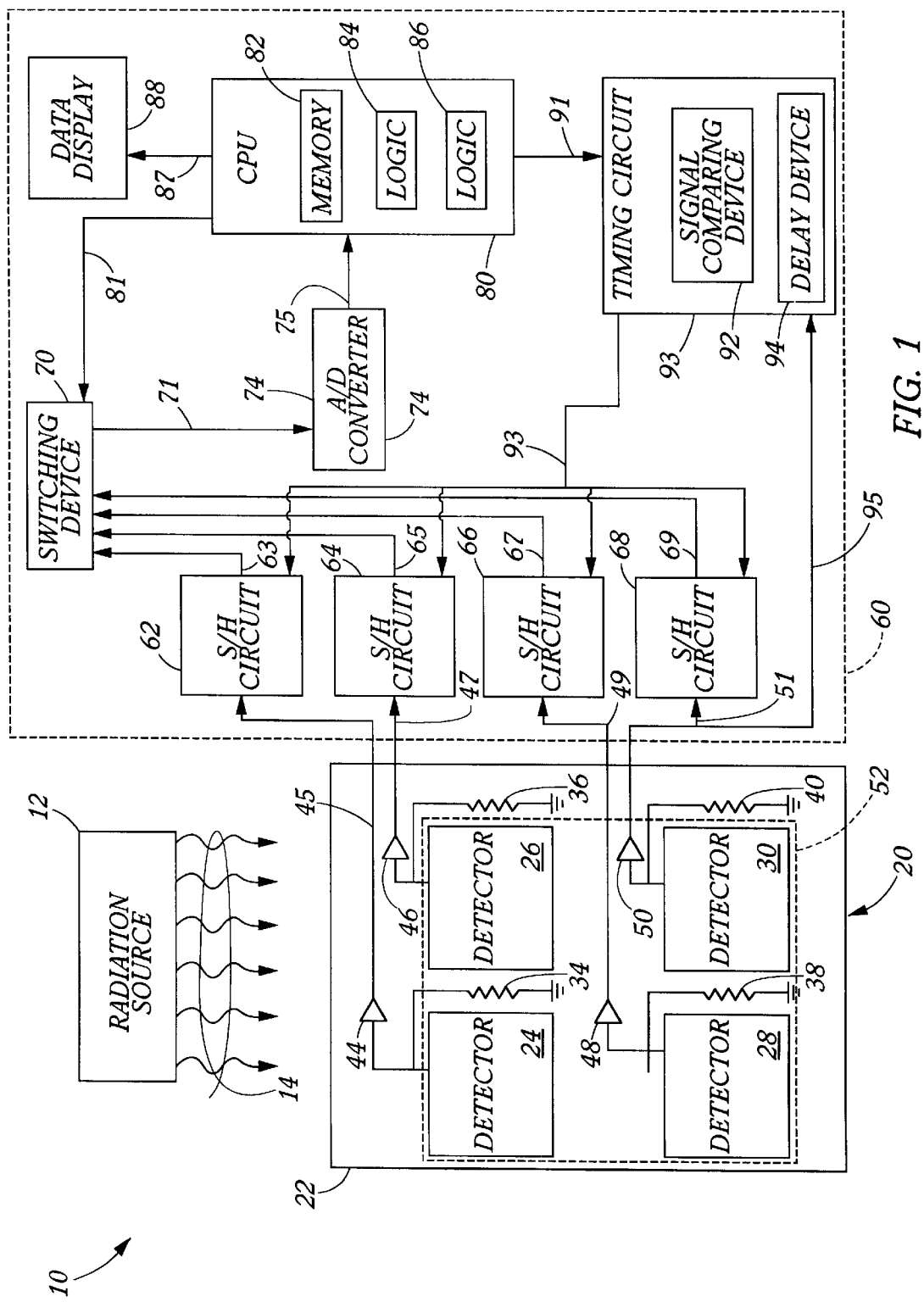
FIG. 1 shows a functional block diagram of the operative components and electronic circuitry of a spatial uniformity measuring apparatus of the present invention.

To achieve the important function of concurrent radiation sampling, the spatial uniformity measuring apparatus 10 of this invention, as illustrated in the functional block diagram of FIG. 1, includes a detector array 20 comprising a plurality of radiation detectors 24, 26, 28, and 30 for concurrently receiving the portions of radiation 14 from radiation source 12 that strike the detector array 20 and for concurrently transmitting electrical signals representative of the intensity of the received radiation over leads 45, 47, 49, and 51, respectively. The measuring apparatus 10 further includes a signal processor circuit 60 electrically connected to the detector array 20 for receiving the concurrently transmitted signals from the detectors 24, 26, 28, and 30 and for processing the signals to determine the intensity of the radiation 14 at each detector location on the detector array 20 to verify whether the radiation source 12 should be adjusted, calibrated, and/or aligned to. establish a desired spatial uniformity, i.e., variance, or lack thereof, from a calculated median intensity at various points in the cross section of the radiation beam 14 (as will be discussed in detail below).

One purpose of the present invention is to provide a device that significantly reduces the time required for aligning a radiation source to produce a radiation beam with a desired amount of spatial uniformity. For example, the radiation source 12 may be a solar light simulator used to test the design of solar arrays, including, for example, measuring current and voltage characteristics of the solar cells in the solar arrays. These solar simulators may include a pulsed xenon or argon lamp filtered to provide radiation. 14 having the standard AM 1.5 global reference spectrum (i.e., 1 sun) used in testing solar arrays for compliance with American Society of Testing and Measurements (ASTM) requirements. Typically, the ASTM requires that a light source produce a light beam with spatial uniformity of 10 percent, 5 percent, or even 2 percent depending on the test accuracy required. Therefore, in this regard, the detector array 20 includes a sufficiently large number of radiation detectors that can be concurrently sampled or read to provide a representative sampling of intensity information at a number of locations within the cross section of the radiation beam 14 from the radiation source 12. With the intensity information corresponding to each detector 24, 26, 28, and 30 location, an operator of the measuring apparatus 10 can determine if spatial uniformity has been achieved or whether adjustments need to be made to the radiation source 12.

Although four detectors 24, 26, 28, and 30 are illustrated, the number of detectors selected for use is almost unlimited and depends on the resolution of the test and the nature of the radiation beam 14, with the number increasing for radiation beams 14 that are larger in size. For example, in one embodiment (not shown) of the present invention, a detector array is provided that includes sixty-four detectors arranged in an 8 by 8 array, similar to the 2 by 2 array of the measuring apparatus 10, to obtain adequate sampling of a relatively large beam cross section. In the illustrated measuring apparatus 10, the detector array 20 is positioned traverse to the radiation beam 14, and more preferably, substantially perpendicular to an axis of the radiation beam 14 such that a cross section of the beam 14 is projected onto the detector array 20. As illustrated in FIG. 1, the detector array 20 includes four detectors 24, 26, 28, and 30 mounted on a planar mounting plate 22. The detectors 24, 26, 28, and 30 are shown approximately equally spaced to form a square radiation receiving area 52 on the mounting plate 22. Although shown as square in shape in FIG. 1, the radiation receiving area 52 is preferably selected to have approximately the same size and shape (e.g., linear, rectangular, circular, oval, and the like) as the cross section of the radiation beam 14 that impinges on the mounting plate 22 so as to provide a better sampling of the radiation beam 14 for spatial uniformity determinations.

The detectors 24, 26, 28, and 30 may be any type of detector that is operable to receive radiation 14 and convert this energy into a signal that is representative of the intensity of the received radiation 14. For example, if the radiation source 12 is a solar simulator, the detectors 24, 26, 28, and 30 preferably are photovoltaic cells that convert the radiant energy in the light (i.e., radiation 14) into electrical energy to provide analog electrical signals that can be processed by the signal processor circuit 60. Although not necessary for;operation of the invention, resistors 34, 36, 38, and 40 are useful if detectors 24, 26, 28, and 30 are photovoltaic cells to get an electrical signal proportional to the radiation 14 intensity. Without the resistors 34, 36, 38, and 40 the signals from the photovoltaic detectors can be logarithmically related (e.g., an electrical signal of 500 millivolts can indicate a received radiation intensity of 100 mWatts/cm$^2$), thereby facilitating later processing by the signal processor circuit 60. To further facilitate processing, the detector array 20 may include signal conditioners 44, 46, 48, and 50 to condition, e.g., amplify such as with a linear or logarithmic operational amplifier (amplification may facilitate obtaining a sufficient signal/noise ratio), the analog electrical signals transmitted by the detectors 24, 26, 28, and 30, respectively, to enhance detection and evaluation by the signal processor circuit 60 components.

According to an important aspect of the present invention and to further achieve the function of concurrent radiation sampling, the signal processor circuit 60 is configured to simultaneously. read or sample each of the detectors 24, 26, 28, and 30. As illustrated in FIG. 1, the signal processor circuit 60 includes a plurality of sample and hold circuits 62, 64, 66, and 68 (e.g., integrated circuits) connected by leads 45, 47, 49, and 51, respectively, to the detectors 24, 26, 28, and 30, respectively, to concurrently receive electrical signals generated by the detectors 24, 26, 28, and 30. Additionally, the sample and hold circuits 62, 64, 66, and 68 are configured, as is well known in the electrical arts, to capture and retain the received analog electrical signals for later processing by the signal processor circuit 60. Typically, the signals will be stored, for example in a capacitor, when the sample and hold circuits 62, 64, 66, and 68 are triggered by a "capture" signal. When the captured signals have been converted and transmitted to the central processing unit (CPU), the "capture" signal is removed, enabling the sample-and-hold circuits to sample the next signal.

To process the stored electrical signals, the signal processor circuit 60 includes a CPU 80 having logic 84, e.g., software; programming, and the like, for determining the intensities of the radiation 14 impinging on each detector 24,.26, 28, and 30 based on the electrical signals stored in the sample and hold circuits 62, 64, 66, and 68, respectively. Since the CPU 80 requires digital input signals, the signal processor circuit 60 includes components for converting the analog electrical signals stored in the sample and hold circuits 62, 64, 66, and 68 into an acceptable numerical digital form. Clearly, any number of analog to digital (A/D) converters or devices could be included in the present invention to provide this conversion function. However, because A/D converters are relatively expensive, it is preferable that a number of analog signals be processed through each included A/D converter. For example, if sixty-four detectors and sample and hold circuits were utilized, it may be useful to have eight A/D converters such that the analog signals could be processed rapidly in eight groups of eight signals.

As illustrated, a single A/D converter 74 (e.g., a 12 or 16 bit A/D converter or the like) is provided for converting the analog signals stored in the four sample and hold circuits 62, 64, 66, and 68 into a digital output that can be transmitted to the CPU 80 via the lead 75. A switching device 70, such as a standard multiplexer, is provided for sequentially selecting a single one of the sample and hold circuits 62, 64, 66, and 68 from which to sequentially transmit the stored analog signal over leads 63, 65, 67, and 69 through the switching device 70 over the single lead or line 71 to the A/D converter 74. This selection process is controlled by the CPU 80 which transmits signals to the switching device 70 over lead 81, e.g., a single lead or more preferably a set of leads, that direct the switching device 70 to select and then transmit the stored signal in certain ones of the sample and hold circuits 62, 64, 66, and 68. In this manner, the CPU 80 is operable for selecting intensity information from specific detectors 24, 26, 28, and 30 and for linking the intensity information with specific detector locations within the radiation receiving area 52, which is useful, as will be discussed later, in displaying the intensity information to an operator of the measuring device 10.

The CPU 80 includes logic 84 for processing the received digital signals from the A/D converter 74 and determining the intensity of the radiation 14 impinging on each of the detectors 24, 26, 28, and 30. This intensity information, along with information necessary to link the intensity information with the location of the detectors 24, 26, 28, and 30, is stored in memory 82 included in the CPU 80. To determine the spatial uniformity of the radiation beam 14, the CPU. 80 further includes logic 86 for taking the intensity values from memory 82 and determining a median intensity value for the radiation 14 striking the detector array 20. The logic 86 then compares the individual intensity values to the calculated median intensity value to determine a relative intensity value at each detector location, which in one embodiment is expressed in percent of the median intensity value (i.e., 97 percent of median, 104 percent of median, and the like). Clearly, there may be applications for which instead of the median intensity value an average intensity value is calculated and used to determine a relative intensity which could be displayed to the operator.

To improve the speed of aligning or adjusting the radiation source 12 to obtain spatial uniformity, a data display 88 is included in the signal processor circuit 60 and is connected to the CPU 80 with lead 87. The data display 88 may be any of a number of computer peripherals useful for displaying information, such as a printer or a monitor. In a preferred embodiment, the data display 88 comprises a monitor screen upon which the CPU 80.displays calculated intensity values and/or relative intensity values as well as other relevant information relating to the radiation source 12 and the detector array 20. These values are preferably displayed in a manner that links each value with the corresponding detector 24, 26, 28, and 30. This linking may be accomplished in a number of ways including in tabular form or in a map or grid format (with the light intensity map or grid being in the shape of the cross section of the radiation beam 14). The values may be displayed strictly in numerical value, e.g., percentages or raw voltages, or, as in a preferred embodiment, the values may be displayed pictorially. In one pictorial embodiment, colors are used to display relative intensity. For example, but not as a limitation, white may be used to represent the median intensity value, shades of green may represent relative intensities greater than median intensity, and shades of red may represent relative intensities less than median intensity. In another embodiment, a perspective or three-dimensional figure is provided on the data display 88 with peaks or high points and valleys or low points being used to represent the relative intensities at the detector locations on the radiation receiving area 52. In the above manner, the data display 88 enables an operator of the measuring apparatus 10 to quickly observe what adjustments, if any, should be made to align and/or calibrate the radiation source 12.

Although optional, the signal processor circuit 60 may include a timing circuit 90 that functions to enhance control of the timing of the sampling. For example, it may be desirable for increasing accuracy and for other purposes, that concurrent sampling of all the detectors 24, 26, 28 and 30 takes place when the intensity of the radiation 14 reaches a certain preset energy level or, in contrast, when the intensity of the radiation 14 drops below a certain preset energy level. This may be especially useful with pulse radiation sources for which it may be desirable to sample at approximately the peak or maximum intensity in a pulse. As illustrated in FIG. 1, the timing circuit 90 is connected to the output lead 51 of the detector 30 via lead 95 to monitor the intensity of the radiation 14 impinging on detector 30. The timing circuit 90 includes signal comparing device or circuit 92 for comparing the monitored electrical signal from the detector 30 with a specific radiation intensity value that is received from the CPU 80 over lead 91. (alternatively, the specific radiation intensity value could be operator inputted and/or controlled). When the signal comparing device 92 determines that the monitored electrical signal is greater than or equal to the received radiation intensity value the timing circuit 90 transmits a sampling signal to sample and hold circuits 62, 64, 66, and 68. In alternate embodiments, the sampling signal could be directed to multiple A/D converters (as will be discussed in connection with FIG. 2) or directly to the CPU 80, but there may be a time delay in this embodiment.

In this manner, the timing circuit 90 allows the measuring apparatus 10 to grab or sample the electrical signals from the detectors 24, 26, 28, and 30 at or near the peak of a pulse's intensity or at any other desired point along a pulse. Additionally, the timing circuit 90 may include a delay device 94 that functions to delay the transmission of the sampling signal for a preset or selectable period of time. For example, it may be useful to detect the pulse rising edge and then delay a particular time during the pulse, e.g., the particular time may be selected to match the time used for a standard test to meet certain standards, such as ASTM specifications. As another example, the radiation intensity value may be some value less than the peak of the pulse and the delay may be set for a period of time such that the sampling signal is transmitted to cause sampling to occur at approximately the peak of the pulse.

Figure 2:
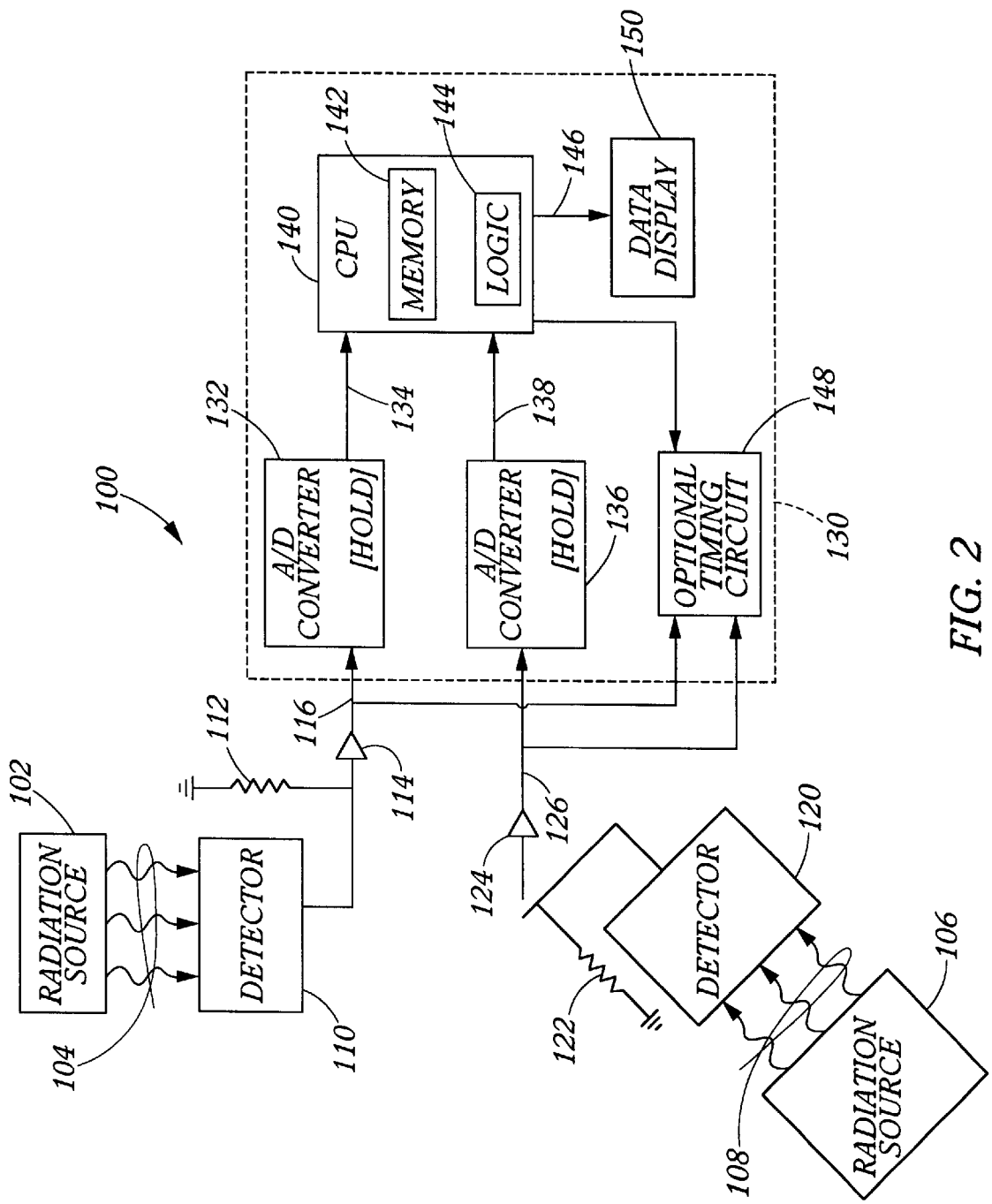
FIG. 2 shows a functional block diagram of the operative components and electronic circuitry of a radiation intensity measuring apparatus of the present invention.

While the planar detector array 20 illustrated in FIG. 1 is useful for establishing the spatial uniformity of radiation 14, there may be many applications when it would be useful to simultaneously determine the intensity of radiation striking a number of non-planar surfaces. For example, in photographic or cinematic applications, it may be desirable to know the light intensity levels on various surfaces, such as on three different walls, caused by one or more light sources. With these objectives in mind, a radiation intensity measuring apparatus 100 is illustrated in FIG. 2 with a first detector 110 and a second detector 120 which are positioned at different locations and facing different directions. The detectors 110 and 120 receive radiation 104 and 108, respectively, from radiation sources 102 and 106, respectively, and in response transmit electrical signals representative of the intensity of the received radiation 104 108 to a signal processor circuit 130 for processing. It should be understood that any number of detectors may be used with the present invention and further, that the number of directions the detectors face is just as numerous, as long as the detectors are capable of concurrently receiving radiation and transmitting intensity-representative signals in response.

Many components of the embodiment illustrated in FIG. 2 are similar to that of corresponding components in the measuring apparatus 10 of FIG. 1 and, therefore, will not be discussed in detail again at this time. It is sufficient at this point to note that the measuring apparatus 100 includes shunt resistors 112, 122 and signal conditioners 114, 124 to enhance the analog electrical signal transmitted by the detectors 110 and 120, respectively, over leads 116 and 126, respectively, to the signal processor circuit 130. Similarly, the signal processor circuit 130 includes a CPU 140 with memory 142 and logic 144 and a data display 150 connected to the CPU 440 with lead 146, each of which functions similarly to corresponding components in the measuring apparatus 10 of FIG. 1.

A significant feature of the measuring apparatus 100 is that this embodiment of the invention achieves the function of concurrent sampling of the multiple detectors 110, 120 without the use of sample and hold or similar circuitry. Instead, the signal processor circuit 130 includes an A/D converter 132, 136 for each detector 110, 120, respectively. The A/D converters 132, 136 receive as input the analog electrical signals the detectors 110, 120 produce in response to the radiation 104, 108 that strikes the detectors 110, 120. The CPU 140 is electrically connected to the A/D converters 132, 136 with leads 134 and 138, respectively, and is operable to selectively and concurrently receive digital signals from the A/D converters 132, 136. An optional timing circuit 148 similar to timing circuit 90 may be included in the signal processor circuit 130 for providing further control of concurrent sampling of the detectors 110, 120 by transmitting a signal to the A/D converters 132, 136 to convert the signals at their impulse, simultaneously. The logic 144 includes programming to process the received digital signals from the A/D converters 132, 136 and to determine radiation intensities at each detector location and to link this information to the detector location for later linked display (as discussed above) on the data display 150.

The calibration of the above discussed embodiments is a relatively simple process that entails measuring signals from the detectors or detector circuits with no radiation present (i.e., striking the detectors) and then with known uniform radiation present. Offsets and gains of the components and circuitry are determined for later use in applying them (as calibration or correction factors) to actual signals. Instead of uniform radiation on the entire detector array, a stable radiation source could be applied to each detector in turn to obtain the offsets and gains.

Furthermore, since numerous modifications and combinations of the above method and embodiments of FIGS. 1 and 2 will readily occur to those skilled in the art, it is not desired to limit the invention to the exact construction and process shown and described above. For example, the present invention clearly would encompass a configuration (not shown) having detectors, amplifiers, and A/D converters integrated into single packages and mounted in the plane of radiation. The mounting of and specific selection of the components that support the detectors will be readily understood by those skilled in the art. Accordingly, resort may be made to all suitable modifications and equivalents that fall within the scope of the invention as defined by the claims which follow. The words "comprise," "comprises," "comprising," "include," "including," and "includes" when used in this specification and in the following claims are intended to specify the presence of stated features, integers, components, or steps, but they do not preclude the presence or addition of one or more other features, integers, components, steps, or groups thereof.

The embodiments of the invention in which an exclusive property or privilege is claimed are defined as follows:

What is claimed is:

1. An apparatus for measuring energy intensities of radiation, comprising:

a first detector positioned at a first position for transmitting at least one electrical signal in response to, and in corresponding relation to the energy intensity of, radiation impinging on said first detector;

a second detector positioned at a second position for transmitting at least one electrical signal in response to, and in corresponding relation to the energy intensity of, radiation impinging on said second detector, wherein said first and said second detectors concurrently receive said impinging radiation and concurrently transmit said electrical signals; and a signal processor circuit electrically connected to said first and second detectors for concurrently receiving and processing said electrical signals from said first and second detectors to determine the energy intensities of the radiation at a single, selectable sample time.

2. The apparatus of claim 1, said electrical signals transmitted by said first and second detectors being analog, wherein said signal processor circuit includes a first signal converter and a second signal converter electrically connected to said first and second detectors, respectively, for receiving said electrical signals and for producing a digital output signal in response to each of said received electrical signals, said first and second signal converters being adapted for simultaneously triggering to simultaneously transmit said digital output signals in response to received trigger signals.

3. The apparatus of claim 1, said electrical signals transmitted by said first and second detectors being analog, wherein said sign processor circuit includes a first sample and hold subcircuit and a second sample and hold subcircuit electrically connected to said first and second detectors, respectively, for receiving said electrical signals and storing said received electrical signals, said first and second sample and hold subcircuits being adapted for storing said stored electrical signals in response to received trigger signals.

4. The apparatus of claim 3, wherein said signal processor circuit includes a multiplexer electrically connected to said first and second sample and hold subcircuits for receiving said released electrical signals as input signals and selectively transmitting said input signals over an output transmission line.

5. The apparatus of claim 1, said apparatus including a sample timing circuit electrically connected to said first detector for monitoring said electrical signal and to said signal processor circuit for receiving a radiation intensity value, wherein said sample timing circuit includes an electrical signal comparing device for comparing said monitored electrical signal to said radiation intensity value and for transmitting a sampling signal to said signal processor circuit when said monitored electrical signal has an energy level of at least that of said radiation intensity value to initiate concurrent sampling of said detectors.

6. The apparatus of claim 1, said signal processing circuit including a central processing unit having logic means for determining the energy intensities of the radiation and memory, means for accumulating and storing the determined energy intensities of the radiation impinging on said first and second detectors.

7. The apparatus of claim 6, said signal processing circuit including a data display device in communication, with said central processing unit for displaying the stored radiation intensities in a linked manner with said first and second positions of said first and second detectors, respectively.

8. The apparatus of claim 1, wherein said first position and said second position are such that said first detector and said second detector face different directions.

9. An apparatus for measuring spatial uniformity of a radiation beam produced by a radiation source, said measuring apparatus comprising:
a detector array positioned transverse to the radiation beam having a plurality of detectors mounted at a corresponding plurality of locations on a planar mounting plate, said detectors being operable for concurrently generating electrical signals representative of the intensities of portions of the radiation beam impinging on said detectors; and
a signal processor circuit electrically connected to each of said detectors in said detector array for concurrently receiving said electrical signals from said detectors and for determining energy intensities of the portions of the radiation beam striking said detector array at each of said detector locations based on said received electrical signals.

10. The apparatus of claim 9, wherein said mounting plate is positioned perpendicular to an axis of the radiation beam such that a cross sectional area of the radiation beam is projected onto said mounting plate.

11. The apparatus of claim 10, wherein said detector locations are selected to form a radiation receiving area on said mounting plate having a shape, size, and location similar to that of the cross sectional area of the radiation beam projected on the mounting plate.

12. The apparatus of claim 11, wherein said detector array includes at least about sixty-four of said detectors substantially equally spaced apart in an eight by eight array to form said radiation receiving area.

13. The apparatus of claim 9, wherein each of said detectors comprises a photovoltaic cell and wherein said detector array includes a plurality of resistors connected to each of said detectors to shunt said detectors such that said detectors provide a linear electrical signal with known energy intensity in response to a specific radiation intensity.

14. The apparatus of claim 13, wherein said detector array further includes a plurality of signal conditioners electrically connected in series with said detectors for conditioning said electrical signals generated by said detectors to facilitate measurement of said electrical signals by said signal processor circuit.

15. The apparatus of claim 14, wherein said signal conditioners are operational amplifiers.

16. The apparatus of claim 9, wherein said electrical signals generated by said detectors are analog and wherein said signal processor circuit includes a plurality of sample and hold subcircuits electrically connected to said detectors for receiving said electrical signals and for storing said electrical signals upon receiving a triggering signal.

17. The apparatus of claim 16, wherein said signal processor circuit includes at least one signal converter for receiving said analog electrical signals and producing a digital output signal in corresponding relation thereto and wherein said signal processor circuit further includes a switching device electrically connected in said signal processor circuit between said sample and hold circuits and said at least one signal converter, said switching device being operable to concurrently receive one or more of said electrical signals stored in said sample and hold circuits and to selectively output said received electrical signals to said at least one signal converter.

18. The apparatus of claim 9, wherein said signal processor circuit includes a central processing unit having logic means for determining the intensities of the portions of the radiation beam impinging on each of said detectors and. memory means for accumulating and storing the determined intensities.

19. The apparatus of claim 18, wherein said central processing unit further includes logic means for determining the spatial uniformity of the radiation beam by first determining a median intensity value for the radiation beam based on said determined intensities and second determining a relative intensity value for each of said detectors relative to said median intensity value.

20. The apparatus of claim 19, wherein said signal processor circuit further includes a data display device. in communication with and operable by said central processing unit for displaying said determined intensities and said relative intensity values.

21. The apparatus of claim 20, said central processing unit includes logic means for operating said data display device to display said relative intensity values numerically and pictorially on a grid system having grid locations representative of said detector locations on said mounting plate.

22. The apparatus of claim 18, wherein said central processing unit further includes logic means for determining the spatial uniformity of the radiation beam by first determining an average intensity value for the radiation beam based on said determined intensities and second determining a relative intensity value for each of said detectors relative to said average intensity value.

23. The apparatus of claim 9, wherein said radiation source is a pulse radiation source and said apparatus includes a pulse detection and sample timing circuit electrically connected to one of said detectors for monitoring said electrical signal from said one detector and electrically connected to said signal processor circuit for receiving a radiation intensity value, wherein said sample timing circuit includes an electrical signal comparing device for comparing said monitored electrical signal to said radiation intensity value and for transmitting a sampling signal to said signal processor circuit when said monitored electrical signal has a preset energy level relative to said radiation intensity value to initiate concurrent sampling of said detectors, whereby said sampling of said detectors can be completed in a single pulse from the radiation source.

24. The apparatus of claim 23, wherein said pulse detection and sample timing circuit includes a delay device for delaying transmission of said sampling signal for a selectable delay period.

25. A method of measuring spatial uniformity of a radiation, beam produced by a radiation source, comprising:

mounting a detector array comprising a plurality of detectors on a planar mounting plate, wherein said detectors are responsive to portions of the radiation beam impinging thereon to generate electrical signals;

positioning said planar mounting plate transverse to an axis of the radiation beam such that said detector array is within a cross-sectional area of the radiation beam projected onto said mounting plate;

electrically connecting a signal processor circuit to each of said detectors in said detector array;

receiving portions of the radiation beam produced by the radiation source concurrently at each of said detectors;

transmitting electrical signals, representative of the intensities of said received portions of the radiation beam, concurrently with each of said detectors to said signal processor circuit; and determining with said signal processor circuit energy intensities of the portions of the radiation beam received by each of said detectors.

26. The method of claim 25, wherein said signal processor circuit includes a plurality of sample and hold subcircuits electrically connected to said detectors, said method further comprising receiving concurrently said electrical signals from said detectors at said sample and hold circuits and storing said received electrical signals in said sample and hold circuits.

27. The method of claim 26, wherein said signal processor circuit includes at least one signal converter electrically connected to said sample and hold circuits, said method further comprising selectively obtaining said stored electrical signals from said sample and hold circuits with said at least one signal converter and producing with said at least one signal converter digital output signals in corresponding relation to said obtained electrical signals.

28. The method of claim 25, wherein said signal processor circuit includes a central processing unit, said method further comprising determining with said central processing unit the intensities of the portions of the radiation beam impinging on each of said detectors and accumulating and storing the determined intensities in memory of said central processing unit.

29. The method of claim 28, further comprising determining with said central processing unit the spatial uniformity of the radiation beam by first determining a median intensity value for the radiation beam based on said determined intensities and second determining a relative intensity value for each of said detectors relative to said median intensity value.

30. The method of claim 29, wherein said signal processor circuit further includes a data display device in communication with said central processing unit, said method further comprising using said central processing unit to operate said data display device to display said determined intensities and said relative intensity values.

31. The method of claim 30, further comprising using said central processing unit to operate said data display device to display said relative intensity values numerically and pictorially on a grid system having grid locations representative of said detector locations on said mounting plate.

* * * * *